June 10, 1930.  E. W. ISOM  1,762,229
ART OF CRACKING HYDROCARBON OILS
Filed April 20, 1927
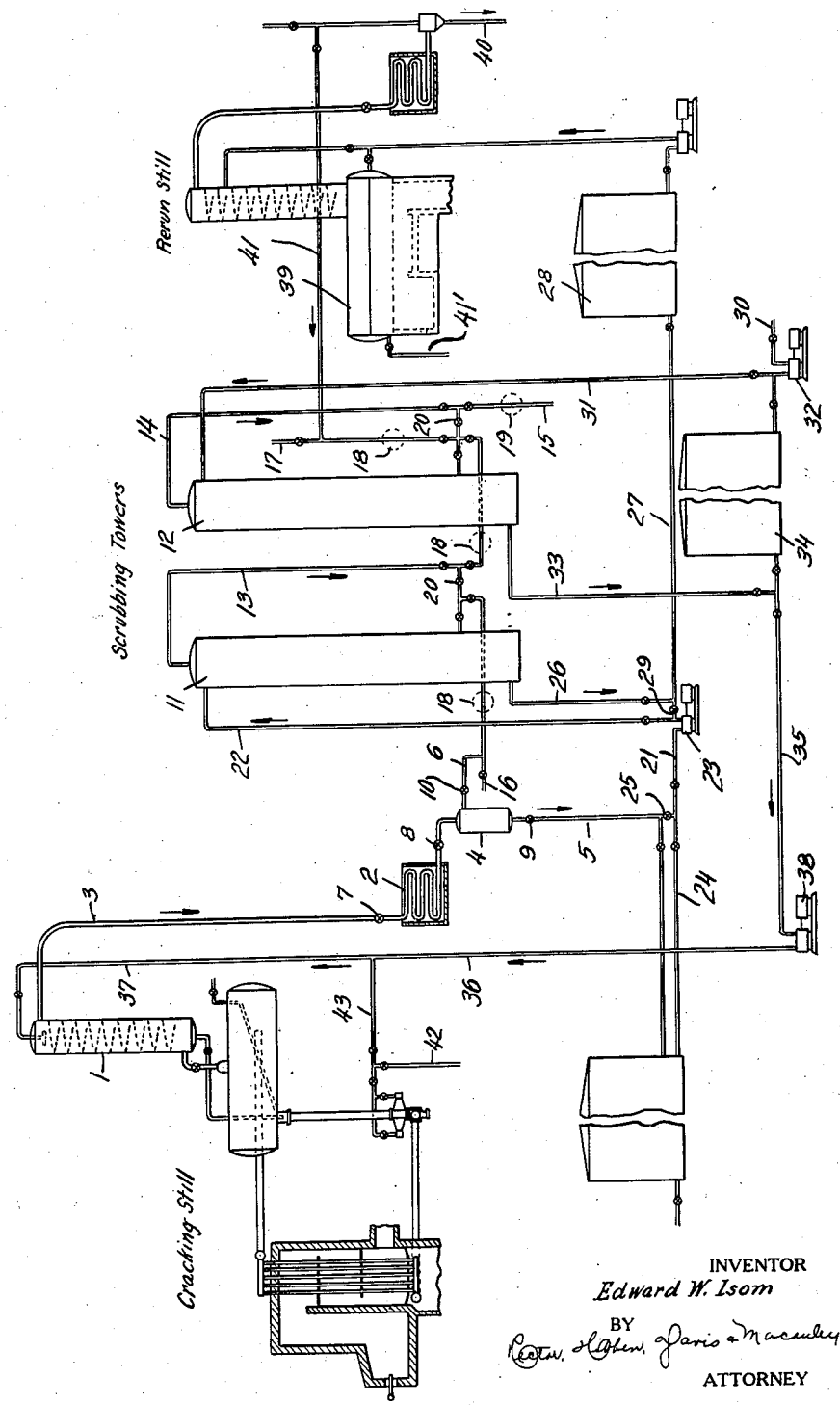
INVENTOR
Edward W. Isom
BY
ATTORNEY Patented June 10, 1930

1,762,229

UNITED STATES PATENT OFFICE

EDWARD W. ISOM, OF SCARSDALE, NEW YORK, ASSIGNOR TO SINCLAIR REFINING COMPANY, OF NEW YORK, N. Y., A CORPORATION OF MAINE

ART OF CRACKING HYDROCARBON OILS

Application filed April 20, 1927. Serial No. 185,117.

This invention relates to improvements in the cracking of heavier and higher boiling hydrocarbon oils, such as gas oil and fuel oil, for the production therefrom of lighter and lower boiling hydrocarbon oils, such as gasoline and gasoline-containing cracked distillates. In such cracking operations, it is common practice to take off from the operation constituents intermediate the raw oil and the desired product which are relatively refractory to the cracking conditions maintained in the operation together with the constituents suitable as components of the desired product. Also, most such cracking operations involve, at some stage, separation of the desired product or of a condensate containing the desired product together with such intermediate constituents by condensation from a mixture of vapors and gases produced in the cracking operation. Usually, in commercial practice, the condensate so produced includes, dissolved or entrained, some gases, such as hydrogen and methane, and some very light vapors, including unsaturated constituents such as ethylene, and the mixture of gases and vapors remaining uncondensed includes constituents suitable as components of the desired product which escape condensation in the condensing operation. Where this condensate includes constituents heavier than suitable as components of the desired product, it is ordinarily redistilled or rerun to separate as a distillate the desired product. Where the condensing operation is carried out under superatmospheric pressure, as is commonly the case, and the pressure on the condensate subsequently reduced to atmospheric pressure, dissolved or entrained gases and very light vapors tend to escape from the condensate and to carry along heavier constituents suitable as components of the desired product. This invention has several important advantages; it includes improvements in the recovery from gas and vapor mixtures remaining after such condensing operations or separated from such condensates on reduction of pressure of condensible constituents suitable as components of the desired product, and in the return to the cracking operation of light unsaturated vapors separated from such condensates or from such gas and vapor mixtures.

In carrying out the present invention, the mixture of vapors and gases from the cracking operation is subjected to condensation, the condensate is separated from the gases and vapors remaining uncondensed, this mixture of gases and uncondensed vapors is scrubbed first with the condensate, or an oil mixture containing the condensate, before the condensate is rerun or redistilled and then with raw oil to be supplied to the cracking operation, and the condensate or oil mixture from the first scrubbing operation is then rerun or redistilled for separation of the desired distillate product. The condensate may be mixed with other distillates with which it is to be blended before it is supplied to the first scrubbing operation. In the first scrubbing operation, the condensate, or crude cracked distillate, absorbs from the gas-vapor mixture vapor constituents suitable as components of the desired product and gives up to the gas-vapor mixture dissolved or entrained gases and very light vapors. In the second scrubbing operation, absorbable constituents of the gas-vapor mixture, including any remaining unabsorbed constituents suitable as components of the desired product and light vapor constituents present in the gas-vapor mixture supplied to the first scrubbing operation and separated from the condensate in the first scrubbing operation, are recovered in the raw oil to be supplied to the cracking operation. As the raw oil containing absorbed constituents is heated up in the cracking operation, the absorbed constituents are driven out and the very light vapor constituents, particularly the unsaturated constituents, to the extent that they are reactive under the prevailing conditions, may enter into the reactions taking place in the cracking operation increasing the yield or making more stable the products of the cracking operation. By using the condensate, or oil mixture containing the condensate, in the first scrubbing operation before it is rerun or redistilled a separate distillation, such as would be necessary if a separate absorbent medium were used, is avoided.

The invention will be further described in connection with the accompanying drawings which illustrate, diagrammatically and conventionally, one form of apparatus adapted for carrying out the invention. Referring to the drawings, it will be appreciated that different types of apparatus may be employed to carry out the various steps effected in the apparatus illustrated, that the invention is useful in connection with other types of cracking operations, and that a recovery system such as that illustrated may be employed in connection with one or several cracking units.

The cracking still illustrated is of the general type described and illustrated in United States Letters Patent No. 1,285,200 granted to the Sinclair Refining Company November 19, 1918, on my application. The still comprises a bulk supply tank located away from a battery of vertical tubes in a heating furnace, and connections including a circulating pump for circulating oil from the bulk supply tank upwardly through the heating tubes and back to the bulk supply tank. Vapors and gases escape from the bulk supply tank through a reflux tower 1 from which the gases and vapors remaining uncondensed escape to a condenser 2 through line 3. For the production of gasoline or a gasoline-containing distillate from gas oil or the like, the still may be operated under a pressure in the neighborhood of 90 to 150 pounds per square inch. It will be understood that this range of pressures is mentioned only by way of example.

The condenser 2 discharges into a receiver 4 in which the condensate and gases and vapors remaining uncondensed separate, the condensate being discharged through line 5 and the gas-vapor mixture through line 6. The still pressure may be reduced in advance of the condenser 2, for example at valve 7, and the condenser operated at atmospheric pressure or at some pressure intermediate atmospheric pressure and the still pressure, or the condenser may be operated at substantially the pressure prevailing in the still. The pressure may be reduced between the condenser 2 and the receiver 4, for example at valve 8, and the separation of condensate and gases and vapors remaining uncondensed carried out at atmospheric pressure or at some pressure intermediate atmospheric pressure and the pressure prevailing in the condenser, or the condenser 2 and the receiver 4 may be operated at substantially the same pressure. The pressure on the condensate may be reduced as it is discharged from the receiver 4, for example at valve 9, and that on the gas-vapor mixture also, for example at valve 10, or the receiver 4 may be operated at substantially the pressure prevailing in the rest of the system.

The gas-vapor mixture discharged from the receiver 4 through line 6 passes first through scrubbing tower 11 and then, by way of line 13, through scrubbing tower 12, from which it is discharged through lines 14 and 15. Other refinery gases containing absorbable vapor constituents may be supplied to the scrubbing towers, for example through line 16 or through line 17. Where such gases or gas mixtures are not saturated or close to saturation with such absorbable constituents it is advantageous to supply them to the second tower 12 through line 17 rather than to the first tower 11. To aid or effect the passage of the gas-vapor mixture through the scrubbing towers, blowers as indicated at 18 or exhausters as indicated at 19 may be used. By-passes 20 are provided to afford ready control of the operation of the scrubbing towers.

Condensate from the cracking operation is supplied to the upper end of scrubbing tower 11 through lines 21 and 22 by means of pump 23. This condensate may be supplied directly from the receiver 4 through lines 5 and 25, or the condensate may first be blended with some other oil or oil mixture and the mixture supplied to the pump 23 through lines 24 and 21. After passing through the scrubbing tower 11, the condensate is discharged through lines 26 and 27, for example to storage as indicated by tank 28. By-pass 29 is provided to assist in control of the operation of scrubbing tower 11.

In the second scrubbing tower 12, the gas-vapor mixture from the first scrubbing tower freed of constituents absorbed by the condensate passed through the first scrubbing tower and containing any constituents given up by this condensate in the first scrubbing tower is scrubbed with raw oil to be supplied to the cracking operation. This raw oil is supplied to the upper end of scrubbing tower 12 through lines 30 and 31 by means of pump 32. The raw oil containing absorbed constituents is discharged from scrubbing tower 12 through line 33. A storage tank 34 is shown connected across lines 31 and 33 to assist in control of scrubbing tower 12. Oil in excess of that required in the scrubbing operation in tower 12 may be discharged from the pump 32 into this tank or oil from the scrubbing operation in excess of that needed for supply to the cracking operation may be discharged into this tank or oil for the cracking operation in excess of that discharged from the scrubbing operation may be supplied from this tank during any fluctuations in operation. The raw oil containing absorbed constituents discharged from scrubbing tower 12 through line 33 is supplied to the cracking operation through lines 35, 36 and 37 or 43 by means of pump 38.

From the tank 28, the condensate or oil mixture containing the condensate is supplied to rerun stills, one of which is shown at 39. In these rerun stills the desired product is separated from any heavier constituents, the desired product being discharged as a distillate through line 40. The heavier constituents of the oil mixture supplied to the rerun stills may be discharged continuously, for example through connection 41', to make the operation continuous. The operation of the rerun still may be controlled by supplying the oil mixture thereto through a tower and regulating the rate at which it is so supplied. Additional oil may be supplied directly to the rerun still. Any gases and uncondensed vapors escaping from the rerunning operation may, with advantage, be returned to the second scrubbing operation, for example, through connection 41.

In addition to the raw oil supplied to the cracking operation through line 36, additional charging stock may be supplied thereto through line 42. Where the raw oil from the second scrubbing operation, that carried out in scrubbing tower 12, contains absorbed a relatively large proportion of constituents suitable as components of the desired product, it is advantageously supplied to the cracking operation proper through a refluxing operation such, for example, as that carried out in reflux tower 1 in the still system illustrated. Here, absorbed constituents are distilled from the raw oil by the heat of the hot mixture of gases and vapors with which it is brought in contact and escape to the condenser 2 with the products fresh from the cracking operation. The return of light vapor constituents, particularly the more reactive of such constituents such as the light unsaturated vapor constituents, to regions of relatively high temperature in the system in which the cracking operation is carried out apparently assist in increasing the yield or in making more stable the products of the cracking operation. The present invention provides for the return of such constituents in a particularly advantageous way.

I claim:

1. In cracking operations for the production of lighter and lower boiling hydrocarbon oils from heavier and higher boiling hydrocarbon oils in which vapors and gases are taken off and subjected to a condensing operation to form a condensate containing the desired product, the improvement which comprises subjecting the mixture of gas and vapor remaining uncondensed from the condensing operation first to a scrubbing treatment with condensate from the said condensing operation, then subjecting the mixture of gas and vapor escaping from the first scrubbing treatment to a scrubbing treatment with raw oil to be supplied to the cracking operation, and supplying raw oil with absorbed constituents from the second scrubbing operation to the cracking operation.

2. In cracking operations for the production of lighter and lower boiling hydrocarbon oils from heavier and higher boiling hydrocarbon oils in which vapors and gases are taken off and subjected to a condensing operation to form a condensate containing the desired product, the improvement which comprises subjecting the mixture of gas and vapor remaining uncondensed from the condensing operation first to a scrubbing treatment with condensate from the said condensing operation before redistillation and then subjecting the mixture of gas and vapor escaping from the first scrubbing treatment to a scrubbing treatment with raw oil to be supplied to the cracking operation, supplying raw oil with absorbed constituents from the second scrubbing operation to the cracking operation, and redistilling the condensate discharged from the first scrubbing operation.

In testimony whereof, I have subscribed my name.

EDWARD W. ISOM.